Figure 1:
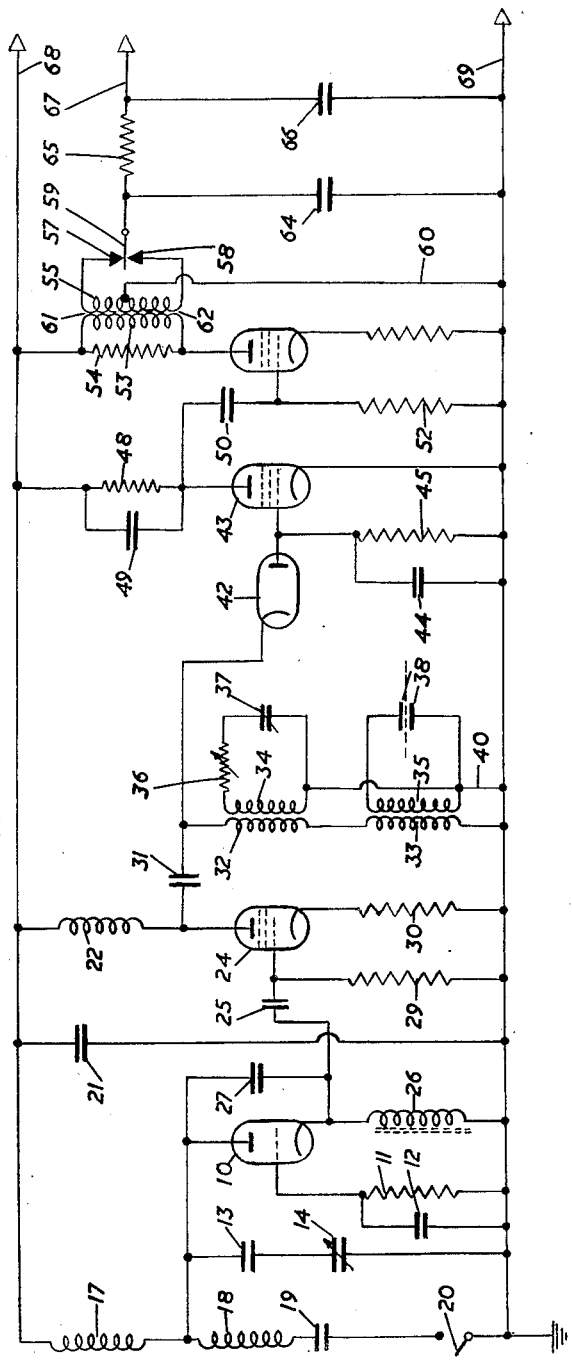

May 16, 1950     M. K. TAYLOR ET AL     2,508,081
MEASUREMENT OR VARIATION OF PHYSICAL
STATES OF MATERIALS

Filed Oct. 21, 1946                      2 Sheets-Sheet 2

INVENTORS
MAURICE K. TAYLOR & ALFRED D. KNOWLES
BY Young, Emery & Thompson
ATTYS -

Patented May 16, 1950

2,508,081

UNITED STATES PATENT OFFICE 2,508,081

MEASUREMENT OR VARIATION OF PHYSICAL STATES OF MATERIALS

Maurice Kenyon Taylor, Belmont, Scotland, and Alfred Douglas Knowles, Chadderton, England, assignors to Ferranti Limited, Hollinwood, England, a British company Application October 21, 1946, Serial No. 704,579
In Great Britain October 25, 1945

6 Claims. (Cl. 175—183)

1

This invention relates to the measurement or variation of physical states of materials such as the dampness of cloth, and in particular to apparatus for achieving this result by utilizing the effect of variation of the physical state on a condenser of which the material forms all or part of the dielectric.

The main object of the present invention is to provide for comparison of the effects of change in said physical state with a standard, this comparison being preferably variable according to the required physical state.

According to the present invention the apparatus comprises two tuned circuits one of which is the "standard" circuit having a "Q" value corresponding to the required dampness, and the other of which contains the two condenser plates between which the material to be tested is inserted, which circuits are tuned to different resonant frequencies, an oscillator supplying oscillations to said circuits, means for varying the frequency of said oscillations through two frequency bands which include the two resonant frequencies, and means to derive a voltage which is proportional to the difference in magnitude of current output pulses from the two tuned circuits. Any suitable means may be provided for indicating the magnitude of this derived voltage or for utilising it to correct any deviation in degree of dampness or other physical state of the material under test from the required value.

The alternate pulses from the tuned circuits may be rectified and amplified, negative current pulses derived from the pulses of one frequency, positive current pulses derived from the pulses of the other frequency, the pulses being then added to derive the required voltage difference.

One of the tuned circuits (the standard circuit) may contain a variable element whereby the "Q" value of the circuit can be varied according to the required degree of dampness. The other tuned circuit (the measuring circuit) will have a varying "Q" value according to the variation of dielectric loss occurring when the degree of dampness or other physical state of the material varies.

The oscillations applied to the tuned circuits are provided by an oscillator valve and circuit. These oscillations may be applied to the grid of a pentode valve, the anode lead of which is inductively coupled to the two tuned circuits.

A constructional form of the invention will now be described by way of example with reference to the accompanying diagrammatic drawings wherein:

2

Figure 2:
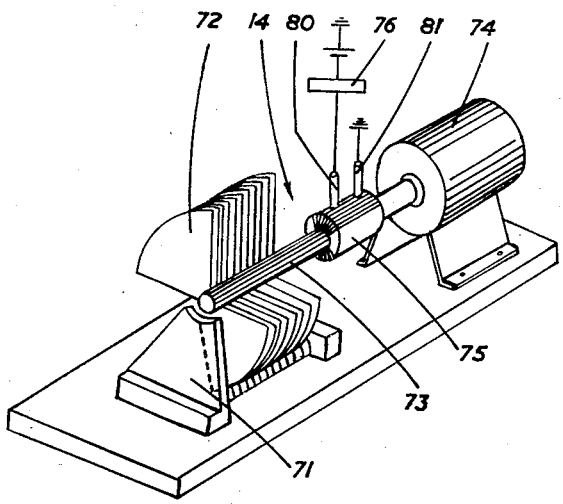

Figure 1 is an electrical circuit diagram of an apparatus made in accordance with the invention; and Figure 2 is a perspective view of part of the apparatus of Figure 1.

An oscillator triode 10 has its grid connected by a suitable grid-leak 11 to earth, this grid-leak having a by-pass condenser 12 connected across it. The anode is connected to one plate of a fixed condenser 13, between the other plate of which and earth is a variable tuning condenser 14. This condenser is motor operated and the condenser and motor will be hereinafter more fully described. The anode is also connected to a position between two inductance coils 17, 18, which are in series and the second of which is connected to one plate of a fixed condenser 19 the other plate of which is connected to one terminal of a switch 20 the other terminal of which is earthed. The switch 20 is operated by a relay controlled by a commutator to be described later. The other coil is connected to one plate of a condenser 21 the other plate of which is earthed, and it is also connected to a high-tension supply and by a choke coil 22 to the anode of a pentode amplifier valve 24 the control grid of which is connected by a fixed condenser 25 to the triode cathode, the latter also being connected to earth through a suitable choke 26 and to one plate of another condenser 27 the other plate of which is connected to the triode anode. The control grid and cathode of the pentode are also earthed through suitable resistances 29, 30 respectively. The anode of the pentode is connected to one plate of a condenser 31 the other plate of which is connected to earth through two inductance coils 32, 33, in series which are coupled respectively with inductance coils 34, 35, respectively in the two tuned circuits. The standard circuit also contains a variable resistance 36 and variable condenser 37 while the measuring circuit contains the plates 38 between which the material is passed, both circuits being earthed by lead 40. The inductance coils 32, 33, are connected to the cathode of a diode detector valve 42 the anode of which is connected to the control grid of a second pentode valve 43 the cathode of which is earthed and between this anode connection and earth are a condenser 44 and a resistance 45 in parallel. The second pentode anode is fed with high-tension current through a resistance 48 in parallel with a condenser 49, and is connected by a condenser 50 to the control grid of a third pentode valve 51, this grid being also earthed through a resistance 52, the cathode of valve 51 is earthed through a resistance. The anode of the third pentode is connected through the primary coil 53 of a transformer to the high-tension supply, a shunt resistance 54 being provided across this coil. The secondary 55 of this transformer has contact points 57, 58, engaged alternately by a movable switch member 59 which is operated by a relay in synchronism with the switch 20. The midpoint of this secondary is earthed by a lead 60 so that the opposite ends 61, 62 of the transformer are of opposite polarity. The switch member 59 is connected to a condenser 64 which is earthed and in parallel with this condenser is a smoothing resistance 65 and condenser 66. A lead 67, between the smoothing resistance and condenser, is taken to a device for indicating and/or controlling the physical state of the material under test. The other grids of the pentode valves are provided with any normal connections customary to their use as amplifying valves. Leads 68, 69, are connected to high tension supply-positive and negative respectively.

The construction and operation of the parts 14, 20 and 59 is shown more fully in Figure 2. The condenser 14 comprises a series of fixed plates 71 which are quadrantal in shape and a series of moveable plates 72 which are earthed by a slip ring (not shown) and have a similar shape to the fixed plates. The moveable plates are fitted onto a rotatable spindle 73 and are symmetrically arranged so as to form two diametrically opposite sets. Rotation of the spindle is effected by a small motor 74.

The spindle 73 carries a commutator 75 which is composed of alternate quadrants of conducting and insulating material. The commutator is engaged by two brushes 80, 81, the former of which is connected to a relay 76 and the latter of which is earthed. Relay 76 controls switches 20 and 59; when the relay is not energised switch 20 is open and switch member 59 makes contact with contact 57; when the relay becomes energised switch 20 closes and switch member 59 simultaneously moves over to contact 58. By this arrangement one set of plates 72 will move through approximately 90 degrees whilst switch 20 is closed and the second inductance coil 18 and condenser 19 are accordingly included in the oscillator circuit, thereby sweeping a frequency band which includes the resonant frequency of the standard circuit, and a pulse of negative polarity is taken from the contact 58 end of the transformer secondary 55; whereupon the commutator causes the relay 76 to open switch 20 and reverse switch 59 so that the second inductance coil is no longer included in the circuit and during the next 90 degrees of revolution of the condenser plates a different frequency band will consequently be swept which includes the resonant frequency of the measuring circuit, and a pulse of positive polarity is taken from the contact 57 end of the transformer secondary. During the next 180 degrees of movement of the condenser plates the effect is repeated with the other set of movable condenser plates. It is arranged that the tuning condenser is at a maximum or minimum value when the second inductance coil is switched in or out of the oscillator circuit so that each frequency band is covered in one direction.

In the arrangement described above voltages are derived from both the standard and measuring circuits which are amplitude modulated by the oscillations supplied by the oscillator. The amplitude in each tuned circuit is a maximum when the oscillator frequency coincides with the resonant frequency of the tuned circuit. These voltages are applied to a diode rectifier to effect demodulation. The resultant signal has a pulsatory wave form which is amplified by the second pentode after which the pulses from one circuit are made negative and the pulses from the other circuit are made positive by means of the changeover switch 59 with a view to adding them in order to obtain the arithmetical difference. For this purpose the pulses are applied to the grid of the pentode valve in the anode lead of which is the transformer 53, 55 the secondary coil of which as already described has its centre point connected to earth so that pulses of opposite polarity derived from the two tuned circuits are developed across that half of the secondary brought into action by switch 59. The condenser 64 accordingly receives alternate positive and negative charges. The pulses are smoothed by means of the condenser 66 and resistance 65, thereby giving a D. C. level of voltage corresponding to the difference in the magnitude of the pulses.

The high inductance of secondary 55 prevents condenser 64 from discharging through the secondary in between pulses.

If the final output difference is negative the "Q" value of the measuring circuit is too small and the material is too wet. If the voltage difference is positive the "Q" value of the measuring circuit is too large and the material is too dry. If the voltage is zero the two "Q" values are the same and the material has the required moisture content.

The difference in the voltages may be used to operate a relay to control the speed with which the material is conveyed through an oven, or the heating of this oven, in which the condenser of the measuring circuit may be located. One suitable apparatus for utilising this difference in voltage is described in U. S. Patent No. 2,460,199.

Instead of sweeping through bands of frequencies by means of variable condenser this may be accomplished by other means e. g. by variable inductance or by electronic means such as a reactance valve having periodically varying bias.

We claim:

1. An apparatus for measuring or varying physical states of materials such as the dampness of cloth comprising two tuned circuits, one of which includes serially connected inductance and capacitance and is the "standard" circuit having "Q" value corresponding to the required physical state, and the other of which contains two condenser plates between which the material to be tested is inserted and an inductance, said circuits being tuned to different resonant frequencies, an oscillator circuit, means inductively coupling the oscillator circuit to said circuits for supplying oscillations to said circuits, means associated with the oscillator circuit for periodically varying the frequency of said oscillations through two frequency bands which include the two resonant frequencies respectively, and means electronically connected with the output of said oscillator circuit to derive a voltage which is proportional to the difference in magnitude of current output pulses from the two tuned circuits.

2. An apparatus for measuring or varying physical states of materials such as the dampness of cloth comprising two tuned circuits, one of which includes serially connected inductance and capacitance and is the "standard" circuit having "Q" value corresponding to the required physical state, and the other of which contains two condenser plates between which the material to be tested is inserted and an inductance, said circuits being tuned to different resonant frequencies, an oscillator circuit, means inductively coupling the oscillator circuit to said circuits for supplying oscillations to said circuits, means associated with the oscillator circuit for periodically varying the frequency of said oscillations through two frequency bands which include the two resonant frequencies respectively, means connected with the output of the oscillator circuit for rectifying and amplifying the pulses from the two tuned circuits and for deriving negative and positive current pulses respectively therefrom, and means for adding these negative and positive pulses thereby obtaining a required voltage difference.

3. An apparatus for measuring or varying physical states of materials such as the dampness of cloth comprising two tuned circuits, one of which includes serially connected inductance and capacitance and is the "standard" circuit having "Q" value corresponding to the required physical state, and the other of which contains two condenser plates between which the material to be tested is inserted and an inductance, said circuits being tuned to different resonant frequencies, an oscillator circuit, means inductively coupling the oscillator circuit to said circuits for supplying oscillations to said circuits, means associated with the oscillator circuit for periodically varying the frequency of said oscillations through two frequency bands which include the two resonant frequencies respectively, said frequency varying means including a frequency band varying element, a switch device for alternately placing said element into and out of said oscillator circuit to alternately change the frequency thereof between two bands, a rectifier connected with the output of said oscillator circuit for rectifying the oscillations, a transformer having a primary and a center tapped secondary winding, electronic amplifying means having its input connected to said rectifier and its output connected to the primary winding whereby rectified pulses are applied to the primary winding, a second switch device alternately connectible with the opposite ends of the secondary winding, whereby pulses of opposite polarity are derived from the rectified pulses, means to operate said frequency varying device and said switch devices in synchronism at a predetermined speed whereby positive pulses are derived from one frequency band and negative pulses from the other, and means to add and smooth these negative and positive pulses thereby producing a required voltage proportional to said difference.

4. An apparatus for measuring or varying physical states of materials such as the dampness of cloth comprising two tuned circuits, one of which includes serially connected inductance and capacitance and is the "standard" circuit having "Q" value corresponding to the required physical state, and the other of which contains two condenser plates between which the material to be tested is inserted and an inductance, said circuits being tuned to different resonant frequencies, an oscillator circuit, means inductively coupling the oscillator circuit to said circuits for supplying oscillations to said circuits, means associated with the oscillator circuit for periodically varying the frequency of said oscillations through two frequency bands which include the two resonant frequencies respectively, said frequency varying means including a frequency band varying element, a switch device for alternately placing said element into and out of said oscillator circuit to alternately change the frequency thereof between two bands, a rectifier connected with the output of said oscillator circuit for rectifying the oscillations, a transformer having a primary and a center tapped secondary winding, means grounding the center tap of the secondary winding, electronic amplifying means having its input connected to said rectifier and its output connected to the primary winding whereby rectified pulses are applied to the primary winding, a second switch device alternately connectible with the opposite ends of the secondary winding, whereby pulses of opposite polarity are derived from the rectified pulses, means to operate said frequency varying device and said switch devices in synchronism at a predetermined speed whereby positive pulses are derived from one frequency band and negative pulses from the other, and means to add and smooth these negative and positive pulses thereby producing a required voltage proportional to said difference.

5. An apparatus for measuring or varying physical states of materials such as the dampness of cloth comprising two tuned circuits, one of which includes serially connected inductance and capacitance and is the "standard" circuit having "Q" value corresponding to the required physical state, and the other of which contains two condenser plates between which the material to be tested is inserted and an inductance, said circuits being tuned to different resonant frequencies, an oscillator circuit for producing oscillations, an amplifying tube having a grid connected to the output of said oscillator circuit, said tube having an anode, a conductor connecting said anode to ground, means for inductively connecting said conductor to said tuned circuits, said frequency varying means including a frequency band varying element, a switch device for alternately placing said element into and out of said oscillator circuit to alternately change the frequency thereof between two bands, a rectifier connected with the output of said oscillator circuit for rectifying the oscillations, a transformer having a primary and a center tapped secondary winding, electronic amplifying means having its input connected to said rectifier and its output connected to the primary winding whereby rectifier pulses are applied to the primary winding, a second switch device alternately connectible with the opposite ends of the secondary winding, whereby pulses of opposite polarity are derived from the rectified pulses, means to operate said frequency varying device and said switch devices in synchronism at a predetermined speed whereby positive pulses are derived from one frequency band and negative pulses from the other, and means to add and smooth these negative and positive pulses thereby producing a required voltage proportional to said difference.

6. An apparatus for measuring or varying physical states of materials such as the dampness of cloth comprising two tuned circuits, one of which includes serially connected inductance and capacitance and is the "standard" circuit having "Q" value corresponding to the required physical state, and the other of which contains two condenser plates between which the material to be tested is inserted and an inductance, said circuits being tuned to different resonant frequencies, an oscillator circuit, means inductively coupling the oscillator circuit to said circuits for supplying oscillations to said circuits, means associated with the oscillator circuit for periodically varying the frequency of said oscillations through two frequency bands which include the two resonant frequencies respectively, means electronically connected with the output of said oscillator circuit to derive a voltage which is proportional to the difference in magnitude of current output pulses from the two tuned circuits, and a variable resistance in the standard tuned circuit to vary the standard physical state.

MAURICE KENYON TAYLOR.
ALFRED DOUGLAS KNOWLES.

REFERENCES CITED

The following references are of record in the file of this patent:

UNITED STATES PATENTS

| Number | Name | Date |
| --- | --- | --- |
| 1,932,337 | Dowling | Oct. 24, 1933 |
| 2,266,114 | Bartlett | Dec. 16, 1941 |
| 2,285,152 | Firestone | June 2, 1942 |
| 2,372,056 | Broding | Mar. 20, 1945 |

FOREIGN PATENTS

| Number | Country | Date |
| --- | --- | --- |
| 524,510 | Germany | May 8, 1931 |